(12) United States Patent
Iwata et al.

(10) Patent No.: US 7,022,389 B2
(45) Date of Patent: Apr. 4, 2006

(54) METHOD OF IMPROVING AIRTIGHTNESS OF HYDRAULIC OR PNEUMATIC DEVICE WITH POLYAMIDE RESIN TUBE

(75) Inventors: Yoshiro Iwata, Yamaguchi (JP); Shinya Matsuda, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 10/853,548

(22) Filed: May 25, 2004

(65) Prior Publication Data

US 2004/0214963 A1 Oct. 28, 2004

Related U.S. Application Data

(62) Division of application No. 10/124,463, filed on Apr. 17, 2002, now abandoned.

(30) Foreign Application Priority Data

Apr. 18, 2001 (JP) .............................. 2001-119122

(51) Int. Cl.
*F16L 13/16* (2006.01)
*F16L 47/00* (2006.01)
(52) U.S. Cl. .................... 428/35.7; 254/264; 428/36.9
(58) Field of Classification Search ............... 428/35.7, 428/36.9; 254/264
See application file for complete search history.

(56) References Cited

U.S. PATENT DOCUMENTS 6,491,994 B1  12/2002  Kito et al.
6,541,085 B1   4/2003  Isobe et al.

FOREIGN PATENT DOCUMENTS

| EP | 0 658 602 A1 | 6/1995 |
| EP | 0 748 847 A2 | 12/1996 |
| GB | 2 264 761 A | 9/1993 |
| JP | 1-185362 A | 7/1989 |

*Primary Examiner*—Ana Woodward
(74) *Attorney, Agent, or Firm*—Akin Gump Strauss Hauer & Feld, LLP

(57) ABSTRACT

A hydraulic or pneumatic device is provided, which comprises a tube comprising a polyamide resin composition comprising (A) from 70 to 97% by weight, based on the weight of the polyamide resin composition, of a polyamide resin and (B) from 3 to 30% by weight, based on the weight of the polyamide resin composition, of a plasticizer comprising an ester of p- and/or o-hydroxybenzoic acid with a $C_{12}$–$C_{22}$ aliphatic alcohol having a branched chain and a component comprising a rubber compound comprising a polar rubber as a main component, and which exhibits a high reliability over an extended period of time.

6 Claims, No Drawings

METHOD OF IMPROVING AIRTIGHTNESS OF HYDRAULIC OR PNEUMATIC DEVICE WITH POLYAMIDE RESIN TUBE

CROSS-REFERENCE TO RELATED APPLICATIONS

This application is a division of U.S. patent application Ser. No. 10/124,463, filed Apr. 17, 2002, now abandoned, the disclosure of which is incorporated herein by reference.

BACKGROUND OF THE INVENTION

The present invention relates to a hydraulic or pneumatic device which exhibits a high reliability over an extended period of time.

The hydraulic tube for power transmission for general industrial use and the pneumatic tube for automobile air brake have heretofore been made of a material such as metal, rubber and resin. However, a tube made of a resin having a lighter weight and a good workability (mountability) has recently been used more and more.

As the material of the resin tube there has been widely used a plasticized flexible material such as nylon 6, nylon 11, nylon 12 and copolymer comprising these nylons as main components from the standpoint of low temperature impact resistance, stress cracking resistance by metal chloride and flexibility.

A handbook of nylon resins describes that nylon 11 and nylon 12 comprise a higher alcohol, hydroxybenzoic acid ester, aromatic sulfonamide, etc. incorporated therein as a plasticizer. Among these nylons, nylons plasticized with an aromatic sulfonamide are normally used.

However, a pneumatic or hydraulic tube made of such an ordinary commercial flexible nylon plasticized by an aromatic sulfonamide-based plasticizer can have an impaired airtightness after a prolonged use. This is because when the tube is exposed to a relatively high temperature, the plasticizer bleeds out to reduce the thickness of the tube, giving an adverse effect, or when an O-ring or the like mainly composed of a polar rubber, in particular NBR, which is normally used, is used as a seal, the plasticizer which then bleeds therefrom and is entrained by air or is extracted with an oil is then absorbed by the sealing material to swell the rubber, deteriorating the sealing properties thereof and hence the airtightness of the tube.

BRIEF SUMMARY OF THE INVENTION

An object of the invention is to provide a hydraulic or pneumatic device which exhibits a high reliability over an extended period of time.

In the invention, it was found that the combined use of a tube comprising a polyamide resin composition comprising (A) a polyamide resin and (B) a plasticizer comprising a specific benzoic acid ester and a component comprising a rubber compound comprising a polar rubber as a main component can provide a hydraulic or pneumatic device with a remarkable improvement in long-term reliability, such as airtightness.

In other words, the invention relates to a hydraulic or pneumatic device comprising a tube comprising a polyamide resin composition comprising (A) from 70 to 97% by weight, based on the weight of the polyamide resin composition, of a polyamide resin and (B) from 3 to 30% by weight, based on the weight of the polyamide resin composition, of a plasticizer comprising an ester of at least one of p-hydroxybenzoic acid and o-hydroxybenzoic acid with a $C_{12}$–$C_{22}$ aliphatic alcohol having a branched chain and a component comprising a rubber compound comprising a polar rubber as a main component.

The invention also relates to a hydraulic or pneumatic device comprising a tube comprising a polyamide resin composition comprising (A) from 50 to 96% by weight, based on the weight of the polyamide resin composition, of a polyamide resin, (B) from 3 to 30% by weight, based on the weight of the polyamide resin composition, of a plasticizer comprising an ester of at least one of p-hydroxybenzoic acid and o-hydroxybenzoic acid with a $C_{12}$–$C_{22}$ aliphatic alcohol having a branched chain and (C) from 1 to 20% by weight, based on the weight of the polyamide resin composition, of an impact-resistant material and a component comprising a rubber compound comprising a polar rubber as a main component.

DETAILED DESCRIPTION OF THE INVENTION

The invention will be further described hereinafter.

The polyamide resin (A) to be used in the invention is made from a diamine and a dibasic acid or made from a lactam or an aminocarboxylic acid or is a copolymer of two or more of these components.

Examples of the diamine include aliphatic diamines, such as tetramethylenediamine, hexamethylenediamine, octamethylenediamine, nonamethylenediamine, undecamethylene diamine and dodecamethylenediamine, and diamines having aromatic cyclic structure, such as methaxylylenediamine.

Examples of the dicarboxylic acid include aliphatic diamines, such as adipic acid, heptanedicarboxylic acid, octanedicarboxylic acid, nonanedicarboxylic acid, undecanedicarboxylic acid and dodecanedicarboxylic acid, and dicarboxylic acids having aromatic cyclic structure, such as terephthalic acid and isophthalic acid.

The lactam is a $C_6$–$C_{12}$ lactam. The aminocarboxylic acid is a $C_6$–$C_{12}$ aminocarboxylic acid. Examples of the $C_6$–$C_{12}$ lactam or the $C_6$–$C_{12}$ aminocarboxylic acid include 6-aminocaproic acid, 7-aminoheptanoic acid, 11-aminoundecanoic acid, 12-aminododecanoic acid, α-pyrrolidone, ε-caprolactam, ω-laurolactam, and ε-enantholactam.

The tube is preferably made of a material having a wide working temperature range, a high thermal stability and an excellent extrudability. As such a material there is preferably used a homopolymer having a relatively low melting point such as polyamide 6, polyamide 11, polyamide 12, polyamide 610 and polyamide 612 or a copolymer such as polyamide 6/66, polyamide 6/12 and polyamide 11/12.

The component (A) to be used in the invention may be a mixture with the other polyamide resin or other polymer. The content of the polyamide resin in the mixture is preferably not lower than 50% by weight based on the weight of the mixture.

Examples of the polyamide resin to be incorporated in the mixture include polyamide 6, polyamide 66, polyamide 11, polyamide 12, polyamide 912, polyamide 1010, polyamide 610, polyamide 612, polyamide 1212, polyamide 6/66 copolymer, polyamide 11/12 copolymer, and polyamide 6/12 copolymer. Examples of the other polymer include polypropylene, ABS resin, polyphenylene oxide, polycarbonate, polyethylene terephthalate, and polybutylene terephthalate.

The polyamide resin to be used as the component (A) in the invention may comprise a function-providing agent, such as heat-resisting agent, weathering agent, crystal nucleating agent, crystallization accelerator, release agent, lubricant, antistatic agent, flame retardant, auxiliary flame retardant, and colorant, incorporated therein.

Specific examples of the heat-resisting agent include hindered phenols, phosphites, thioethers, and copper halide. These compounds may be used singly or in combination.

Examples of the weathering agent include hindered amines, and salicylates. These compounds may be used singly or in combination.

Examples of the crystal nucleating agent include inorganic fillers, such as talc and clay, and organic crystal nucleating agents, such as fatty acid metal salt. These compounds may be used singly or in combination.

Examples of the crystallization accelerator include low molecular polyamides, higher fatty acids, higher fatty acid esters, and higher aliphatic alcohols. These compounds may be used singly or in combination.

Examples of the release agent include fatty acid metal salts, fatty acid amides, and various waxes. These compounds may be used singly or in combination.

Examples of the antistatic agent include aliphatic alcohols, aliphatic alcohol esters, and higher fatty acid esters. These compounds may be used singly or in combination.

Examples of the flame retardant include metal hydroxides, such as magnesium hydroxide, phosphorus, ammonium phosphate, ammonium polyphosphate, melamine cyanurate, ethylenedimelamine dicyanurate, potassium nitrate, brominated epoxy compound, bromated polycarbonate compound, brominated polystyrene compound, tetrabromobenzyl polyacrylate, tribromophenol polycondensate, polybromobiphenyl ethers, and chlorine-based flame retardants. These compounds may be used singly or in combination.

The plasticizer (B) to be used in the invention is made from an ester of p-hydroxybenzoic acid and/or o-hydroxybenzoic acid with a $C_{12}$–$C_{22}$ aliphatic alcohol having a branched chain. The alcohol from which the ester is produced needs to have branched chains and from 12 to 22 carbon atoms. Any saturated or unsaturated alcohols may be used so far as they satisfy these requirements.

An ester of such an alcohol with hydroxybenzoic acid exhibits a good compatibility with the polyamide resin, hardly renders the surface of the resin sticky, has a low volatility and exerts a sufficient plasticizing effect.

On the contrary, an ester comprising an alcohol having 11 or less carbon atoms as a starting material is disadvantageous in that it has a high volatility. An ester comprising an alcohol having 23 or more carbon atoms as a starting material has a low volatility but exerts an insufficient plasticizing effect.

Further, an ester comprising an alcohol free of branched chain as a starting material cannot attain both low volatility and plasticizing effect.

As the alcohol from which the ester is produced there may be used 2-octyl octanol, 2-octyldodecyl alcohol, 2-hexyl decanol, 2-decyl decanol, 2-decyldodecyl alcohol, 2-ethyl-dodecyl alcohol, 2-octyl-3-octenol or the like.

The amount of the plasticizer to be incorporated is from 3 to 30% by weight, preferably from 5 to 15% by weight, based on 100% by weight of the polyamide resin composition. When the amount of the plasticizer to be incorporated exceeds 30% by weight, the resulting tube exhibits a lowered burst pressure and undergoes bleedout to disadvantage.

Examples of the impact-resistant material (C) to be used in the invention include ionomer, ethylene-α-olefin copolymer, ethylene-α-olefin terpolymer, polystyrene-polyethylene-butylene block copolymer, polystyrene-hydrogenated polyisoprene block copolymer, rubber such as ethylene octene rubber, elastomer, modification products thereof, mixtures thereof or the like.

The amount of the impact-resistant material to be incorporated is from 1 to 20% by weight, preferably from 2 to 10% by weight, based on 100% by weight of the polyamide resin composition. When the amount of the impact-resistant material to be incorporated exceeds 20% by weight, the resulting tube exhibits a lowered burst pressure and has a disadvantageous weathering problem.

On the other hand, examples of the polar rubber to be used in the invention include NBR (acrylonitrile-butadiene rubber), CHR (halobutyl rubber), CSM (chlorosulfonated polyethylene), CLPE (chlorinated polyethylene), urethane, and fluoro rubber.

A hydraulic or pneumatic device is highly likely to come in contact with a nonpolar oil such as mineral oil and thus preferably comprises a polar rubber, in particular an NBR-based rubber as a component from the standpoint of oil resistance and price.

Further, these polar rubbers may be used in the form of mixture with other polar or nonpolar rubbers or a flexible resin such as PVC (polyvinyl chloride). Moreover, the polar rubber of the invention may comprise additives which are normally incorporated in rubbers. Examples of the additives employable herein include vulcanizing agent, vulcanization accelerator, vulcanization promoter, scorch retarder, antioxidant, peptizer, tackfier, rubber softener, reinforcing agent/filler, flame retardant, colorant, and foaming agent.

The polyamide resin composition of the invention is formed into a tube form which is then used as a hydraulic/pneumatic line. As necessary, a multi-layer tube comprising at least one layer of polyamide resin composition tube of the invention, may also be used in the hydraulic or pneumatic device of the invention. Further, a hose having a high pressure resistance obtained by intertwining a reinforcing yarn or the like on the periphery of the polyamide resin composition tube of the invention, and then further covering the tube by an elastomer or rubber may be used in the hydraulic or pneumatic device of the invention. The composition of the invention has an adaptability as a polyamide material for automobiles and thus can be used also for automobile air brakes. For parts which need to expand and contract, the composition of the invention may be used as a coil tube formed by coiling the composition.

Referring to the process for the production of the tube of the invention, a molten resin which has been extruded from an extruder can be extruded through a die into a cylindrical form which is then solidified by cooling sizing to obtain a desired tubular product.

Examples of the process for the production of a multi-layer tube include a process which comprises introducing a molten resin extruded from extruders in a number corresponding to the number of layers constituting the tube or the number of materials used into one die for a multi-layer tube, allowing various layers to be bonded to each other while being inside the die or shortly after being extruded from the die, and then processing the material in the same manner as in ordinary tube forming, and a process which comprises forming a single-layer tube, and then coating the tube with other layers.

Further, a pressure-resistant hose can be obtained by a process which comprises extruding a molten resin onto a mandrel so that it is coated, subjecting the material to braiding, knitting, spiral, wrapping, insert, etc., to form a reinforcing layer thereon, coating the material with an elastomer or rubber, and then subjecting the material to crosslinking.

The polar rubber composition of the invention can be worked into an oil seal, O-ring or the like, which is then used as a component of the hydraulic or pneumatic device.

The hydraulic or pneumatic device of the invention, contains at least one clamping part, wherein the component formed by a polar rubber compound is used as a sealing material in the clamping part.

Examples of other constituents of the hydraulic or pneumatic device of the invention include those which are normally incorporated in hydraulic or pneumatic devices such as pump, connector, controller, valve and cylinder.

Specific examples of the hydraulic or pneumatic device of the invention include pneumatic brake, hydraulic brake, door switch, locking device, air suspension device, hydraulic steering, trailer brake, hoist controller, industrial machine hydraulic device, and lubricant supplier.

The reason why the hydraulic or pneumatic device comprising a polyamide resin composition tube of the invention and a polar rubber component has a high long-term reliability is presumed as follows.

The polyamide resin composition of the invention comprises a plasticizer which hardly undergoes bleeding (volatilization) or extraction as compared with the conventional benzenesulfonic acid-based plasticizer and thus has an enhanced dimensional stability that stabilizes the clamping portion or reduces the movement toward the rubber layer, giving little absolute effect. The plasticizer to be incorporated in the polyamide resin composition has a lower polarity (SP value) than the conventional benzenesulfonic acid-based plasticizer. The resulting polar rubber has a low swelling. The term "SP value" as used herein means a solubility parameter. The solubility parameter has been defined as the square root of the cohesive energy density and describes the attractive strength between molecules of the material. (see Polymer Handbook VII, pp. 519–557) The closer the SP values of molecules, the higher the compatibility thereof.

Further, the combined use of a tube made of a plastic nylon resin composition having both a relatively excellent pressure resistance and a high flexibility giving a good handleability and a rubber component gives a degree of freedom at which various requirements can be met by various combinations of resin tube and rubber component and thus has a high value of industrial utilization.

The invention will be explained below in more detail by reference to the following Examples and Comparative Examples, but the invention should not be construed as being limited thereto.

The measurement of physical properties in the Examples and Comparative Examples were conducted as follows.

Tube Properties

The tube was subjected to burst pressure (and hoop stress) and low temperature impact tests in accordance with the method defined in DIN73378. For the evaluation of the low temperature impact strength, the tube which had been cooled to a temperature of −40° C. was given an impact by a hammer in a Charpy impact tester, and then observed for break.

Dimensional Stability

A test piece having a size of 30 mm×100 mm×3 mm thick was formed. The test piece thus formed was treated in a 100° C. oven with internal air circulation for 72 hours, and then evaluated for change of dimension and weight. The test piece was also dipped in a 100° C. JIS 3 oil for 72 hours, and then similarly evaluated for change of dimension and weight. For the determination of change of dimension, longitudinal and crosswise changes were averaged.

Test of Dipping of O-Ring in Plasticizer

In order to evaluate the effect of the plasticizer bled or evaporated from the tube on an O-ring in the form of a mixture with a lubricant, the O-ring was measured for change after being dipped in a mixture of the lubricant and the plasticizer. As the lubricant there was used DEXRON III. The concentration of the plasticizer was from 0% to 10% by volume based on the total volume of the lubricant and the plasticizer. The dipping temperature was 100° C. After a predetermined period of time of dipping, the O-ring was withdrawn from the mixture, and then evaluated by the measurement of weight and outermost diameter and by tensile test. In order to determine the reference value of weight and dimension of the outermost diameter of the O-ring, the values of 10 undipped samples were averaged.

EXAMPLE 1

A polyamide resin composition containing 90% by weight, based on the weight of the polyamide resin composition, of polyamide 12 (UBESTA3030U, produced by Ube Industries, Ltd.) and 10% by weight, based on the weight of the polyamide resin composition, of p-hydroxybenzoic acid-2-hexyldecylester (hereinafter referred to as "benzoic acid ester plasticizer A") was melt-kneaded through a twin-screw extruder to form pellets which were then processed in a 70° C. vacuum dryer for 48 hours to prepare a sample.

EXAMPLE 2

A polyamide resin composition containing 85% by weight, based on the weight of the polyamide resin composition, of polyamide 12 (UBESTA3030U, produced by Ube Industries, Ltd.), 5% by weight, based on the weight of the polyamide resin composition, of a modified EPR (T7712SP, produced by JSR) and 10% by weight, based on the weight of the polyamide resin composition, of p-hydroxybenzoic acid-2-hexyldecylester (hereinafter referred to as "benzoic acid ester plasticizer A") was melt-kneaded through a twin-screw extruder to form pellets which were then processed in a 70° C. vacuum dryer for 48 hours to prepare a sample.

COMPARATIVE EXAMPLE 1

A polyamide resin composition containing 90% by weight, based on the weight of the polyamide resin composition, of polyamide 12 (UBESTA3030U, produced by Ube Industries, Ltd.) and 10% by weight, based on the weight of the polyamide resin composition, of benzenesulfonbutylamide (hereinafter referred to as "benzenesulfonic acid plasticizer A") was melt-kneaded through a twin-screw extruder to form pellets which were then processed in a 70° C. vacuum dryer for 48 hours to prepare a sample.

COMPARATIVE EXAMPLE 2

A polyamide resin composition containing 85% by weight, based on the weight of the polyamide resin composition, of polyamide 12 (UBESTA3030U, produced by Ube Industries, Ltd.), 5% by weight, based on the weight of the polyamide resin composition, of a modified EPR (T7712SP, produced by JSR) and 10% by weight, based on the weight of the polyamide resin composition, of benzenesulfonbutylamide (hereinafter referred to as "benzenesulfonic acid plasticizer A") was melt-kneaded through a twin-screw extruder to form pellets which were then processed in a 70° C. vacuum dryer for 48 hours to prepare a sample.

These pelletized samples were each plasticized by a full-flighted screw extruder to give a molten resin which was then extruded from a die through a head adapter to form a cylinder. The cylinder was then solidified by a sizing die in a vacuum cooling water bath. The cylinder thus solidified was then withdrawn by a pulling device to form a tube. Using this device, a tube having an outer diameter of 12 mm and a thickness of 1.5 mm was prepared.

The tube thus formed was then evaluated for burst pressure (hoop stress) and low temperature impact resistance each according to DIN73378. The results are set forth in Table 2.

These pelletized samples were each subjected to injection molding. The molten resin was injected through a film gate to form a test piece having a size of 30 mm (transverse direction)×100 mm (machine direction)×3 mm (thickness) which was then evaluated for change of dimension and weight at 100° C.

TABLE 1

|  | Polyamide | Plasticizer |  | Impact-resistant |
|---|---|---|---|---|
|  | resin Polyamide 12 % by weight | Benzoic acid ester plasticizer A % by weight | Benzenesulfonic acid plasticizer A % by weight | material Modified EPR % by weight |
| Example 1 | 90 | 10 |  |  |
| Example 2 | 85 | 10 |  | 5 |
| Comparative Example 1 | 90 |  | 10 |  |
| Comparative Example 2 | 85 |  | 10 | 5 |

TABLE 2

|  | Burst pressure MPa | Hoop stress MPa | Low temperature impact resistance Number of units broken/number of units tested |
|---|---|---|---|
| Example 1 | 6.9 | 24.2 | 2/10 |
| Example 2 | 6.4 | 22.5 | 0/10 |
| Comparative Example 1 | 6.6 | 23.1 | 1/10 |
| Comparative Example 2 | 6.3 | 22.1 | 0/10 |

TABLE 3

|  | 100° C. heat treatment | | 100° C. JIS 3 oil treatment | |
|---|---|---|---|---|
|  | Change of dimension | Change of weight | Change of dimension | Change of weight |
| Example 1 | −0.8% | −1.0% | −0.5% | −0.2% |
| Example 2 | −0.6% | −0.9% | −0.1% | −0.1% |
| Comparative Example 1 | −2.9% | −5.1% | −2.5% | −6.1% |
| Comparative Example 2 | −2.6% | −4.8% | −1.8% | −5.5% |

EXAMPLE 3

An O-ring made of NBR was dipped in an automatic oil (DEXRON III) having 5% by volume, based on the total volume of the automatic oil and benzoic acid ester plasticizer A, of benzoic acid ester plasticizer A added thereto at a temperature of 100° C. for 1,000 hours. The O-ring was then evaluated for change of dimension, change of weight, tensile strength at break when hooked and elongation at break. The results are set forth in Table 4.

EXAMPLE 4

The test procedure of Example 3 was followed except that an automatic oil having 10% by volume of benzoic acid ester plasticizer A added thereto was used. The results are set forth in Table 4.

COMPARATIVE EXAMPLE 3

The test procedure of Example 3 was followed except that an automatic oil having 5% by volume of benzenesulfonic acid plasticizer A added thereto was used. The results are set forth in Table 4.

COMPARATIVE EXAMPLE 4

The test procedure of Example 3 was followed except that an automatic oil having 10% by volume of benzenesulfonic acid plasticizer A added thereto was used. The results are set forth in Table 4.

COMPARATIVE EXAMPLE 5

The test procedure of Example 3 was followed except that only an automatic oil was used. The results are set forth in Table 4.

TABLE 4

| | Treating conditions | | | Physical properties | | | |
|---|---|---|---|---|---|---|---|
| | Plasticizer | Concentration of plasticizer (vol %) | Time (hr) | Dimensional increase[*1] (%) | Weight increase[*1] (%) | Strength at break (N) | Elongation at break[*2] (mm) |
| | Untreated | Untreated | Untreated | — | — | 272 | 109 |
| Comparative Example 5 | None | 0 | 260 | 0 | −1 | 279 | 105 |
| | | | 500 | 0 | −2 | 242 | 72 |
| | | | 1,000 | 0 | −2 | 225 | 46 |
| Example 3 | Benzoic acid ester plasticizer A | 5 | 260 | 2 | 7 | 278 | 117 |
| | | | 500 | 3 | 6 | 271 | 111 |
| | | | 1,000 | 4 | 7 | 222 | 71 |
| Example 4 | Benzoic acid ester plasticizer A | 10 | 260 | 6 | 15 | 271 | 119 |
| | | | 500 | 6 | 16 | 231 | 113 |
| | | | 1,000 | 5 | 17 | 204 | 94 |
| Comparative Example 3 | Benzene-sulfonic acid plasticizer A | 5 | 260 | 6 | 20 | 235 | 112 |
| | | | 500 | 6 | 16 | 175 | 96 |
| | | | 1,000 | 5 | 13 | 161 | 61 |
| Comparative Example 4 | Benzene-sulfonic acid plasticizer A | 10 | 260 | 31 | 145 | 52 | 74 |
| | | | 500 | 38 | 172 | 36 | 94 |
| | | | 1,000 | 39 | 177 | 12 | 147 |

[*1]The values of 10 untreated samples were averaged to determine the reference value.
[*2]Elongation of the entire sample when loaded The hydraulic or pneumatic device of the invention can be used as a hydraulic or pneumatic device with a high reliability over an extended period of time because the tube made of polyamide resin composition incorporated therein has an excellent dimensional stability, is not subject to troubles, such as thickness reduction, and gives extremely little effect on rubber mainly composed of butadiene, in particular NBR, for use in sealing.

The hydraulic or pneumatic device of the invention has mechanical properties good enough for automobile use and thus has an excellent total performance.

While the invention has been described in detail and with reference to specific embodiments thereof, it will be apparent to one skilled in the art that various changes and modifications can be made therein without departing from the spirit and scope thereof.

We claim:

1. A method for improving the airtightness of a hydraulic or pneumatic device comprising:
   providing a hydraulic or pneumatic tube comprising a polyamide resin composition comprising:
   (A) from 70 to 97% by weight, based on the weight of the polyamide resin composition, of a polyamide resin and
   (B) from 3 to 30% by weight, based on the weight of the polyamide resin composition, of a plasticizer comprising an ester of at least one of p-hydroxybenzoic acid and o-hydroxybenzoic acid with a $C_{12}$–$C_{22}$ aliphatic alcohol having a branched chain; and
   combining the tube with at least one clamping part containing a component comprising a rubber compound comprising a polar rubber as a main ingredient, wherein the component comprising a rubber compound is used as a sealing material in the clamping part.

2. The method according to claim 1, wherein said polyamide resin is selected from the group consisting of polyamide 6, polyamide 11, polyamide 12, polyamide 66, polyamide 610, polyamide 612, and copolymers thereof.

3. The method according to claim 1, wherein said polar rubber comprises acrylonitrile-butadiene rubber as a main component.

4. A method for improving the airtightness of a hydraulic or pneumatic device comprising:
   providing a hydraulic or pneumatic tube comprising a polyamide resin composition comprising:
   (A) from 50 to 96% by weight, based on the weight of the polyamide resin composition, of a polyamide resin,
   (B) from 3 to 30% by weight, based on the weight of the polyamide resin composition, of a plasticizer comprising an ester of at least one of p-hydroxybenzoic acid and o-hydroxybenzoic acid with a $C_{12}$–$C_{22}$ aliphatic alcohol having a branched chain, and
   (C) from 1 to 20% by weight, based on the weight of the polyamide resin composition, of an impact-resistant material; and
   combining the tube with at least one clamping part containing a component comprising a rubber compound comprising a polar rubber as a main ingredient, wherein the component comprising a rubber compound is used as a sealing material in the clamping part.

5. The method according to claim 4, wherein said polyamide resin is selected from the group consisting of polyamide 6, polyamide 11, polyamide 12, polyamide 66, polyamide 610, polyamide 612, and copolymers thereof.

6. The method according to claim 4, wherein said polar rubber comprises acrylonitrile-butadiene rubber as a main component.

* * * * *